(12) United States Patent
Jauh et al.

(10) Patent No.: US 11,979,861 B2
(45) Date of Patent: May 7, 2024

(54) REVERSE TRIGGER SYSTEM OF MULTIPLE ACCESS POINT OPERATION INCLUDING COMMON STATION, INITIALIZER AP AND FIRST COORDINATED AP, AND ACCESS POINT

(71) Applicant: SPREADTRUM COMMUNICATIONS (SHANGHAI) CO., LTD., Shanghai (CN)

(72) Inventors: Yuhren Jauh, Shanghai (CN); Yanchao Xu, Shanghai (CN); Chinghwa Yu, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 428 days.

(21) Appl. No.: 16/980,753

(22) PCT Filed: Jul. 20, 2020

(86) PCT No.: PCT/CN2020/102951
§ 371 (c)(1),
(2) Date: Sep. 14, 2020

(87) PCT Pub. No.: WO2021/013118
PCT Pub. Date: Jan. 28, 2021

(65) Prior Publication Data
US 2022/0417924 A1 Dec. 29, 2022

(30) Foreign Application Priority Data
Jul. 24, 2019 (CN) .......................... 201910670388.9

(51) Int. Cl.
*H04W 48/20* (2009.01)
*H04W 36/06* (2009.01)
(Continued)

(52) U.S. Cl.
CPC ....... *H04W 72/0446* (2013.01); *H04W 36/06* (2013.01); *H04W 36/08* (2013.01);
(Continued)

(58) Field of Classification Search
CPC ............. H04L 12/242; H04L 29/06891; H04L 45/028; H04L 63/0457; H04W 88/08;
(Continued)

(56) References Cited

U.S. PATENT DOCUMENTS

2006/0258350 A1* 11/2006 Roy .................. H04W 36/0061
455/435.1
2013/0242769 A1* 9/2013 Hammarwall ........ H04L 5/0016
370/252

(Continued)

FOREIGN PATENT DOCUMENTS

CN 104113905 A 10/2014
CN 104581854 A 4/2015
(Continued)

OTHER PUBLICATIONS

CNIPA First Office Action for corresponding CN Application No. 201910670388.9; dated Jun. 24, 2022.
(Continued)

Primary Examiner — Salvador E Rivas
(74) Attorney, Agent, or Firm — CANTOR COLBURN LLP

(57) ABSTRACT

A reverse trigger system of multiple access point (multi-AP) operation and an Access Point (AP) are provided. The reverse trigger system includes: a common station; an initializer AP configured to send a trigger announcement to the common station, wherein the common station sends a trigger frame in response to receiving the trigger announcement; and at least one first coordinated AP configured to send first data in response to receiving the trigger frame, wherein the
(Continued)

initializer AP is configured to send second data in response to receiving the trigger frame. Embodiments of the present disclosure may enable joint and synchronous data transmission between APs which cannot communicate with each other directly.

14 Claims, 2 Drawing Sheets

(51) Int. Cl.
| | |
|---|---|
| *H04W 36/08* | (2009.01) |
| *H04W 72/0446* | (2023.01) |
| *H04L 9/40* | (2022.01) |
| *H04L 45/028* | (2022.01) |
| *H04W 88/08* | (2009.01) |
| *H04W 92/20* | (2009.01) |

(52) U.S. Cl.
CPC ........... *H04W 48/20* (2013.01); *H04L 45/028* (2013.01); *H04L 63/0457* (2013.01); *H04W 88/08* (2013.01); *H04W 92/20* (2013.01)

(58) Field of Classification Search
CPC ..... H04W 48/20; H04W 36/08; H04W 36/06; H04W 28/0804; H04W 28/0835; H04W 12/00516
See application file for complete search history.

(56) References Cited

U.S. PATENT DOCUMENTS

| | | | |
|---|---|---|---|
| 2013/0322375 A1 | 12/2013 | Chang et al. | |
| 2015/0229699 A1* | 8/2015 | Liu | H04N 21/4122 |
| | | | 709/217 |
| 2015/0288428 A1 | 10/2015 | Choi et al. | |
| 2016/0105836 A1* | 4/2016 | Seok | H04W 72/23 |
| | | | 370/331 |
| 2016/0286477 A1 | 9/2016 | Lin et al. | |
| 2016/0302254 A1 | 10/2016 | Dai et al. | |
| 2017/0104563 A1 | 4/2017 | Lee et al. | |
| 2018/0123844 A1* | 5/2018 | Noh | H04L 27/2626 |
| 2018/0205434 A1 | 7/2018 | Cherian et al. | |
| 2019/0306685 A1* | 10/2019 | Cariou | H04W 72/0446 |

FOREIGN PATENT DOCUMENTS

| | | | | |
|---|---|---|---|---|
| CN | 105451340 A | | 3/2016 | |
| CN | 106550344 A | | 3/2017 | |
| CN | 106788622 A | | 5/2017 | |
| CN | 108370298 A | | 8/2018 | |
| CN | 109673028 A | | 4/2019 | |
| CN | 111245763 A | | 6/2020 | |
| EP | 3043486 A1 | * | 7/2016 | ............. H04B 7/024 |
| EP | 3043486 A1 | | 7/2016 | |
| JP | 2005322982 A | | 11/2005 | |
| WO | 2015058411 A1 | | 4/2015 | |
| WO | 2015081567 A1 | | 6/2015 | |

OTHER PUBLICATIONS

IPIN Office Action for corresponding IN application No. 202217009696; dated Jul. 18, 2022.

International Search Report and Written Opinion of the International Searching Authority for International Application No. PCT/CN2020/102951; dated Oct. 21, 2020.

EPO Extended European Search Report for corresponding EP Application No. 20843354.0; dated Jun. 27, 2023.

* cited by examiner

REVERSE TRIGGER SYSTEM OF MULTIPLE ACCESS POINT OPERATION INCLUDING COMMON STATION, INITIALIZER AP AND FIRST COORDINATED AP, AND ACCESS POINT

CROSS REFERENCE TO RELATED APPLICATIONS

This is the U.S. national stage of application No. PCT/CN2020/102951, filed on Jul. 20, 2020. Priority under 35 U.S.C. § 119(a) and 35 U.S.C. § 365(b) is claimed from Chinese Application No 201910670388.9, filed Jul. 24, 2019, and entitled "REVERSE TRIGGER SYSTEM OF MULTIPLE ACCESS POINT OPERATION, AND ACCESS POINT" the disclosure of which is also incorporated herein by reference.

TECHNICAL FIELD

The present disclosure generally relates to wireless communication technology field, and more particularly, to a reverse trigger system of multiple access point operation, and an access point.

BACKGROUND

In wireless local area network protocols, joint functions of multiple Access Points (APs) are discussed. Trigger frames are sent among APs to synchronize and/or initiate data transmission. For example, for access points AP1 and AP2, AP1 sending a trigger frame to AP2 or AP2 sending a trigger frame to AP1 can trigger AP1 and AP2 to synchronously send data to a station.

However, in multi-AP trigger solutions in existing techniques, it is required that a distance between a triggered AP and an AP sending a trigger frame is within a certain range, that is, the two APs can communicate directly.

SUMMARY

Embodiments of the present disclosure may enable joint and synchronous data transmission between APs which cannot communicate with each other directly.

Embodiments of the present disclosure provide a reverse trigger system of multiple access point (multi-AP) operation, including: a common station; an initializer AP configured to send a trigger announcement to the common station, wherein the common station sends a trigger frame in response to receiving the trigger announcement; and at least one first coordinated AP configured to send first data in response to receiving the trigger frame, wherein the initializer AP is configured to send second data in response to receiving the trigger frame.

Optionally, the common station and the initializer AP are located in a same basic service set.

Optionally, the trigger announcement includes an identifier of the at least one first coordinated AP.

Optionally, if an AP receives data sent by the initializer AP through Out of Band (OOB), and receives the trigger frame within a preset time after receiving the data, and the trigger announcement does not include an identifier of the at least one first coordinated AP, the AP serves as the at least one first coordinated AP.

Optionally, the trigger announcement further includes a start time and an end time for sending the trigger frame, and the common station sends the trigger frame between the start time and the end time.

Optionally, the second data and the first data are the same data, and the initializer AP uses OOB to send the second data to the at least one first coordinated AP.

Optionally, the second data is different from the first data.

Optionally, the initializer AP sends the second data to the common station, and the at least one first coordinated AP sends the first data to other stations.

Optionally, the initializer AP sends the second data to the common station, and the at least one first coordinated AP sends the first data to the common station.

Optionally, the trigger announcement further includes information of a receiving station of the second data.

Optionally, the reverse trigger system further includes a second coordinated AP configured to send third data in response to the trigger announcement.

Optionally, the first data and the second data are Space-time Stream (STS) in a Space-time Block Code (STBC) format, and when the at least one first coordinated AP includes a plurality of first coordinated APs, each first coordinated AP is configured to send the first data or the second data.

Embodiments of the present disclosure further provide an AP, including: a notification circuitry configured to send a trigger announcement to a common station, wherein the common station sends a trigger frame in response to the trigger announcement; and a data sending circuitry configured to send second data in response to receiving the trigger frame, wherein a first coordinated AP sends first data in response to receiving the trigger frame.

Embodiments of the present disclosure may provide following advantages.

In the embodiments of the present disclosure, the reverse trigger system of multi-AP operation includes: a common station; an initializer AP configured to send a trigger announcement to the common station, wherein the common station sends a trigger frame in response to receiving the trigger announcement; and at least one first coordinated AP configured to send first data in response to receiving the trigger frame, wherein the initializer AP is configured to send second data in response to receiving the trigger frame. For APs that cannot communicate with each other directly, that is, the initializer AP and the first coordinated AP, the multi-AP operation can be triggered through the common station either of them can communicate with. That is, the common station can receive the trigger announcement from the initializer AP, and in response to the trigger announcement, send the trigger frame to the first coordinated AP, so that the initializer AP and the first coordinated AP can send the first data and the second data synchronously. In this way, multi-AP operation is completed between the APs that cannot communicate with each other directly, which expands an applicable scope of multi-AP operation in wireless communication.

DETAILED DESCRIPTION

As described in the background, in multi-AP trigger solutions in existing techniques, it is required that a distance between a triggered AP and an AP sending a trigger frame is within a certain range, that is, the two APs can communicate directly.

In the embodiments of the present disclosure, for APs that cannot communicate with each other directly, that is, the initializer AP and the first coordinated AP, the multi-AP operation can be triggered through the common station either of them can communicate with. That is, the common station can receive the trigger announcement from the initializer AP, and in response to the trigger announcement, send the trigger frame to the first coordinated AP, so that the initializer AP and the first coordinated AP can send the first data and the second data synchronously. In this way, multi-AP operation is completed between the APs that cannot communicate with each other directly, which expands an applicable scope of multi-AP operation in wireless communication.

The multi-AP operation in the embodiments of the present disclosure may include multi-AP coordinated operation and multi-AP joint operation. The multi-AP coordinated operation refers to multiple APs respectively sending data to different stations, and multi-AP joint operation refers to multiple APs respectively sending data to a same station.

In order to make the above objectives, features and beneficial effects of the present disclosure more obvious and understandable, specific embodiments of the present disclosure are described in detail below with reference to accompanying drawings.

Figure 1:
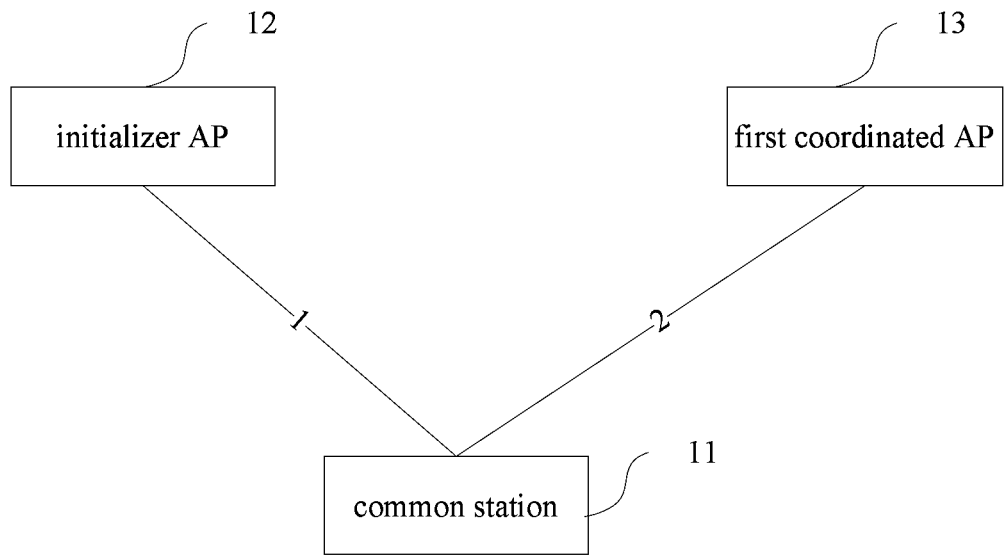
FIG. 1 is a structural diagram of a reverse trigger system of multi-AP operation according to an embodiment.

FIG. 1 is a structural diagram of a reverse trigger system of multi-AP operation according to an embodiment.

Referring to FIG. 1, the reverse trigger system of multi-AP operation includes a common station 11, an initializer AP 12 and at least one first coordinated AP 13.

The initializer AP 12 is configured to send a trigger announcement to the common station 11, which is shown as data stream 1 in FIG. 1. The common station 11 sends a trigger frame in response to receiving the trigger announcement, which is shown as data stream 2 in FIG. 1.

The at least one first coordinated AP 13 is configured to send first data in response to receiving the trigger frame.

In the embodiment, the first coordinated AP 13 is relatively far away from the initializer AP 12, and they cannot communicate with each other directly. Specifically, the initializer AP 12 and the common station 11 may be located in one basic service set, and the first coordinated AP 13 and the common station 11 may be located in another basic service set, so that the initializer AP 12 can communicate with the common station 11, and the first coordinated AP 13 can also communicate with the common station 11. When a multi-AP operation is required, the common station 11 can be used to trigger the multi-AP operation of the initializer AP 12 and the first coordinated AP 13.

It should be noted that the number of the at least one first coordinated AP 13 may be one or multiple, which is not limited in the embodiments of the present disclosure.

In some embodiments, the common station 11 may be a roaming Station (STA) between basic service sets.

In some embodiments, the initializer AP 12 is configured to send second data in response to receiving the trigger frame.

In some embodiments, the trigger announcement includes an identifier of the at least one first coordinated AP. That is, the trigger announcement sent by the initializer AP 12 to the common station 11 includes the identifier of the first coordinated AP 13, so that the common station 11 can learn a receiving target of its trigger frame, then an AP that receives the trigger frame serves as the first coordinated AP 13 for cooperating with the initializer AP 12 to send data.

In some embodiments, if an AP receives data sent by the initializer AP through OOB, and receives the trigger frame within a preset time after receiving the data, and the trigger announcement does not include an identifier of the at least one first coordinated AP, the AP serves as the at least one first coordinated AP.

The OOB refers to a transmission method other than currently used wireless channels, and may be a wireless or wired transmission method.

In the embodiment, for a case that the trigger announcement does not contain the identifier of the first coordinated AP, the AP can check whether it receives data sent by the initializer AP through OOB, and whether it receives the trigger frame within a preset time after receiving the data, so as to determine whether it serves as the first coordinated AP 13 for cooperating with the initializer AP 12 to send data.

It should be noted that the preset time may be pre-arranged by the first coordinated AP 13 and the initializer AP 12, or may be agreed through an agreement, which is not limited in the embodiments of the present disclosure.

In some embodiments, the first data and the second data may be the same or different, and receiving stations of the first data and the second data may be the same or different.

In some embodiments, when AP1 needs to perform multi-AP operation, it sends, to a station a, a trigger announcement including an identifier of AP2. The station a sends a trigger frame to AP1 and AP2, so as to enable AP2 to perform multi-AP operation with AP1.

In the embodiments of the present disclosure, for APs that cannot communicate with each other directly, that is, the initializer AP and the first coordinated AP, the multi-AP operation can be triggered through the common station either of them can communicate with. That is, the common station can receive the trigger announcement from the initializer AP, and in response to the trigger announcement, send the trigger frame to the first coordinated AP, so that the initializer AP and the first coordinated AP can send the first data and the second data synchronously. In this way, multi-AP operation is completed between the APs that cannot communicate with each other directly, which expands an applicable scope of multi-AP operation in wireless communication.

In some embodiments, the second data and the first data are the same data, and the initializer AP uses OOB to send the second data to the at least one first coordinated AP.

In the embodiment, the data sent by the initializer AP 12 and the first coordinated AP 13 are the same data, and the data may be sent by the initializer AP 12 to the first coordinated AP 13 using OOB. In other words, the initializer AP 12 uses a wired or wireless transmission channel that is different from wireless transmission channels used for transmitting information (such as data information, control information or trigger announcement) with other stations to send data to the first coordinated AP 13, so as to ensure that an air interface time of original wireless transmission channels is not occupied.

In some embodiments, the second data is different from the first data.

In the embodiment, in the multi-AP operation, the initializer AP 12 and the first coordinated AP 13 respectively send their data to the station.

In some embodiments, the initializer AP sends the second data to the common station, and the at least one first coordinated AP sends the first data to other stations.

In the embodiment, the multi-AP operation performed by the initializer AP 12 and the first coordinated AP 13 may be a multi-AP coordinated operation, that is, the first data and the second data are sent respectively to different stations, and the first data and the second data may be the same or different.

Alternatively, in some embodiments, the initializer AP sends the second data to the common station, and the at least one first coordinated AP sends the first data to the common station.

In the embodiment, the multi-AP operation performed by the initializer AP 12 and the first coordinated AP 13 may be a multi-AP joint operation, that is, the first data and the second data are sent respectively to the same station, such as the common station 11, and the first data and the second data may be the same or different.

Figure 2:
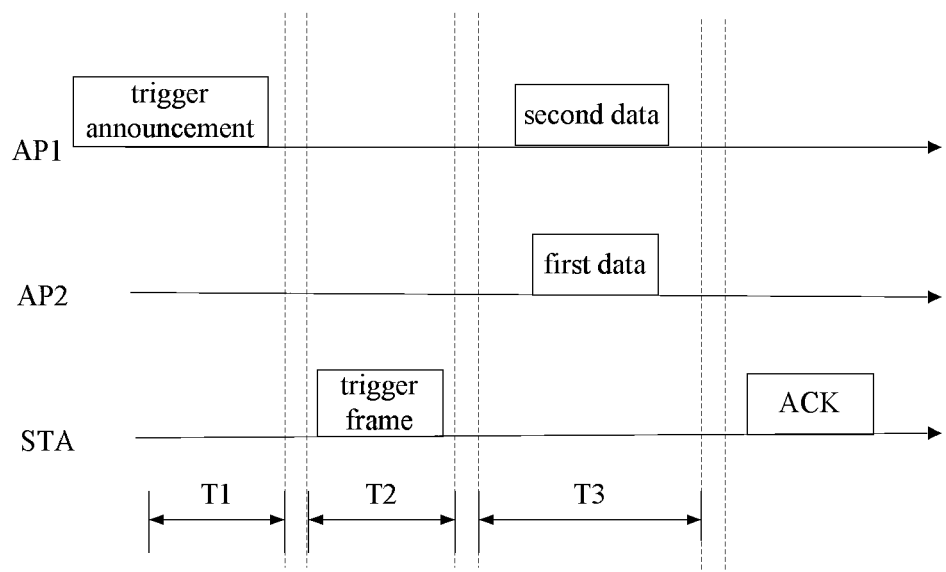
FIG. 2 illustrates a specific application scenario.

Still referring to FIG. 2, in some embodiments, AP1 and AP2 respectively send second data and first data within a time period T3. A start time of the time period T3, that is, a time when the first data or the second data starts to be sent, has a preset time offset from the trigger frame. When AP1 and AP2 perform the multi-AP joint operation, a sending time of the first data and a sending time of the second data are fully synchronized, and an end time of the first data and an end time of the second data are also fully synchronized. When AP1 and AP2 perform the multi-AP coordination operation, the sending time of the first data and the sending time of the second data may not be completely synchronized, that is, there may be a certain deviation. Similarly, the end time of the first data and the end time of the second data may also not be completely synchronized.

It should be noted that a start time of sending the first data or the second data may be consistent with a start time of the time period T3.

After receiving the data, the STA may send an acknowledgement (ACK).

Specifically, a time interval among the time period T1, the time period T2, and the time period T3 may be a Short Interframe Space (SIFS). Specific length of the SIFS may be referred to the existing techniques, and is not limited in the embodiments of the present disclosure.

In some embodiments, the trigger announcement further includes a start time and an end time for sending the trigger frame, and the common station sends the trigger frame between the start time and the end time.

Still referring to FIG. 2, AP1 sends the trigger announcement within the time period T1, and the trigger announcement includes the start time and end time of sending the trigger frame, that is, the start time and end time of the time period T2. The common station STA sends a trigger frame within the time period T2.

Figure 3:
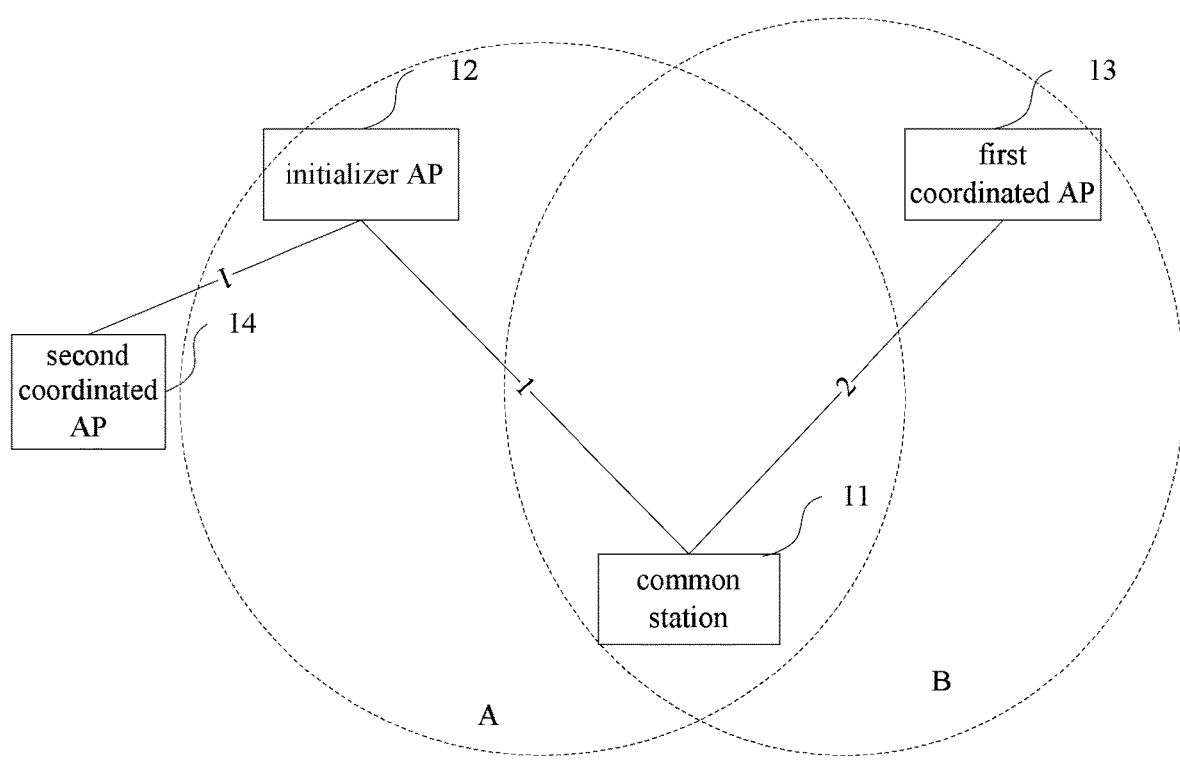
FIG. 3 is a structural diagram of a reverse trigger system of multi-AP operation according to an embodiment.

Specifically, referring to FIG. 3, the second coordinated AP 14 cannot receive the trigger frame, but needs to send data after the trigger frame, thus, it needs to obtain the start time and end time of the trigger frame or the start time of T3. As the second coordinated AP 14 can receive the trigger announcement, the start time and end time of the trigger frame or the start time of T3 may be carried in the trigger announcement.

In some embodiments, the trigger announcement may not include the start time and end time of sending the trigger frame. In this case, the second coordinated AP 14 and the initializer AP 12 have agreed on time information of the trigger frame in advance, so there is no need to include the start time and end time of the trigger frame in the trigger announcement.

In some embodiments, the trigger announcement further includes information of a receiving station of the second data.

In other words, the initializer AP 12 may carry information of the station to whom its data is to be sent in the trigger announcement, so that the common station can learn the information of the receiving station of the second data sent by the initializer AP 12, and further the first coordinated AP 13 can also learn the information of the receiving station of the second data sent by the initializer AP 12, which may avoid interference to transmission of the second data caused by the first coordinated AP 13 sending the first data.

Referring to FIG. 1 and FIG. 3, in some embodiments, the reverse trigger system may further include a second coordinated AP 14 configured to send third data in response to the trigger announcement.

In the embodiment, the second coordinated AP 14 may receive the trigger announcement from the initializer AP 12, and send the third data in response to the trigger announcement.

As the first coordinated AP 13 and the initializer AP 12 are located in different basic service sets, as shown in the basic service set B shown in FIG. 3, and the common station 11 is located in both the basic service set A and the basic service set B, the first coordinated AP 13 needs to send the first data in response to the trigger frame sent by the common station 11. Alternatively, the common station 11 has not joined the basic service set B, and the first coordinated AP 13 may send the first data in response to the trigger frame sent by the common station 11.

Further, when the second coordinated AP 14 sends the third data in response to the trigger announcement, it may send the third data after a first preset time offset following receiving the trigger announcement. When the first coordinated AP 13 sends the first data in response to the trigger frame, it may send the first data after a second preset time offset following receiving the trigger frame, so as to ensure that the first data and the third data are synchronously transmitted. The first preset time offset is greater than the second preset time offset.

In some embodiments, the first data and the second data are STS in an STBC format, and when the at least one first coordinated AP includes a plurality of first coordinated APs, each first coordinated AP is configured to send the first data or the second data.

In the embodiments of the present disclosure, the multi-AP operation is performed by adopting the STS in the STBC format, which may reduce requirements of wireless communication systems on timing accuracy.

Figure 4:
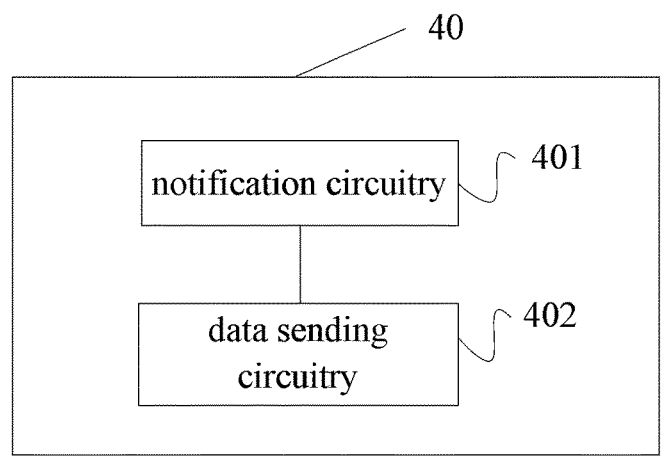
FIG. 4 is a structural diagram of an AP.

Referring to FIG. 4, embodiments of the present disclosure further provide an AP 40. The AP 40 may include a notification circuitry 401 and a data sending circuitry 402.

The notification circuitry 401 is configured to send a trigger announcement to a common station, wherein the common station sends a trigger frame in response to the trigger announcement. The data sending circuitry 402 is configured to send second data in response to receiving the trigger frame, wherein a first coordinated AP sends first data in response to receiving the trigger frame. The first coordinated AP and the AP 40 are located in different basic service sets, and the trigger announcement includes an identifier of the first coordinated AP.

In some embodiments, the AP 40 may be the initializer AP 12 shown in FIG. 1 or FIG. 3.

In some embodiments, the AP 40 includes, but is not limited to, any communicable terminal devices such as mobile phones, computers, tablet computers, or routers.

More details of working principles and working modes of the AP 40 can be referred to related descriptions of FIG. 1 to FIG. 3, and are not described in detail here.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A reverse trigger system of multiple access point (multi-AP) operation, comprising:
   a common station;
   an initializer AP configured to send a trigger announcement to the common station, wherein the common station sends a trigger frame in response to receiving the trigger announcement; and
   at least one first coordinated AP configured to send first data in response to receiving the trigger frame,
   wherein the initializer AP is configured to send second data in response to receiving the trigger frame,
   wherein based on that an AP receives data sent by the initializer AP through Out of Band (OOB), and receives the trigger frame within a preset time after receiving the data, and the trigger announcement does not comprise an identifier of the at least one first coordinated AP, the AP serves as the at least one first coordinated AP.

2. The reverse trigger system according to claim 1, wherein the common station and the initializer AP are located in a same basic service set.

3. The reverse trigger system according to claim 1, wherein the trigger announcement comprises an identifier of the at least one first coordinated AP.

4. The reverse trigger system according to claim 1, wherein the trigger announcement further comprises a start time and an end time for sending the trigger frame, and the common station sends the trigger frame between the start time and the end time.

5. The reverse trigger system according to claim 1, wherein the second data and the first data are the same data, and the initializer AP uses OOB to send the second data to the at least one first coordinated AP.

6. The reverse trigger system according to claim 5, wherein the initializer AP sends the second data to the common station, and the at least one first coordinated AP sends the first data to other stations.

7. The reverse trigger system according to claim 5, wherein the initializer AP sends the second data to the common station, and the at least one first coordinated AP sends the first data to the common station.

8. The reverse trigger system according to claim 1, wherein the second data is different from the first data.

9. The reverse trigger system according to claim 8, wherein the initializer AP sends the second data to the common station, and the at least one first coordinated AP sends the first data to other stations.

10. The reverse trigger system according to claim 8, wherein the initializer AP sends the second data to the common station, and the at least one first coordinated AP sends the first data to the common station.

11. The reverse trigger system according to claim 1, wherein the trigger announcement further comprises information of a receiving station of the second data.

12. The reverse trigger system according to claim 1, further comprising:
   a second coordinated AP configured to send third data in response to the trigger announcement.

13. The reverse trigger system according to claim 1, wherein the first data and the second data are Space-time Stream (STS) in a Space-time Block Code (STBC) format, and when the at least one first coordinated AP comprises a plurality of first coordinated APs, each first coordinated AP is configured to send the first data or the second data.

14. An initializer access point (AP), comprising:
   a notification circuitry configured to send a trigger announcement to a common station, wherein the common station sends a trigger frame in response to the trigger announcement; and
   a data sending circuitry configured to send second data in response to receiving the trigger frame, wherein a first coordinated AP sends first data in response to receiving the trigger frame,
   wherein based on that an AP receives data sent by the initializer AP through Out of Band (OOB), and receives the trigger frame within a preset time after receiving the data, and the trigger announcement does not comprise an identifier of the first coordinated AP, the AP serves as the first coordinated AP.

* * * * *